United States Patent
Winkam

[11] Patent Number: 6,092,985
[45] Date of Patent: Jul. 25, 2000

[54] CONNECTION FOR A TORQUE CONVERTER

[75] Inventor: Gamjad Winkam, Zolling, Germany

[73] Assignee: Bayerische Motoren Werke Aktiengesellschaft, Munich, Germany

[21] Appl. No.: 09/182,527

[22] Filed: Oct. 30, 1998

[30] Foreign Application Priority Data

Oct. 30, 1997 [DE] Germany .......................... 197 47 964

[51] Int. Cl.$^7$ ................................................ F01D 15/12
[52] U.S. Cl. .................... 415/124.1; 415/122.1; 415/229; 415/213.1; 416/170 R; 416/180; 416/197 C; 416/204 A; 416/60
[58] Field of Search ............................. 415/122.1, 124.1, 415/229, 214.1, 121.1, 213.1; 416/170 R, 180, 197 C, 204 A, 244 A, 55, 60, 146 R; 60/330

[56] References Cited

U.S. PATENT DOCUMENTS

| | | |
|---|---|---|
| 2,777,292 | 1/1957 | Mazzola . |
| 3,845,622 | 11/1974 | Hufstader ................................ 60/330 |
| 4,056,019 | 11/1977 | Ahlen ...................................... 74/677 |
| 4,129,050 | 12/1978 | Akashi et al. ........................ 74/750 R |
| 4,407,398 | 10/1983 | Fiala ..................................... 792/0.055 |
| 4,484,656 | 11/1984 | Bird ....................................... 181/114 |
| 4,743,776 | 5/1988 | Baehler et al. ......................... 290/31 |
| 5,125,284 | 6/1992 | Carriere .................................. 74/424 |

FOREIGN PATENT DOCUMENTS

| | | |
|---|---|---|
| 17 80 276 | 8/1968 | Germany . |
| 21 31 953 | 6/1971 | Germany . |
| 23 37 328 | 7/1973 | Germany . |
| 41 22 135 | 1/1993 | Germany . |
| 195 22 869 | 1/1997 | Germany . |
| 1 576 804 | 10/1980 | United Kingdom . |

Primary Examiner—Edward K. Look
Assistant Examiner—Ninh Nguyen
Attorney, Agent, or Firm—Evenson, McKeown, Edwards & Lenahan, P.L.L.C.

[57] ABSTRACT

A driving connection is provided for torque transfer in the drive line of a motor vehicle for releasable connection of a crankshaft with a pump wheel of a coaxially mounted hydrodynamic torque converter in which the pump wheel is mounted so that it is rotatably supported integrally with the housing by a radial bearing.

11 Claims, 1 Drawing Sheet

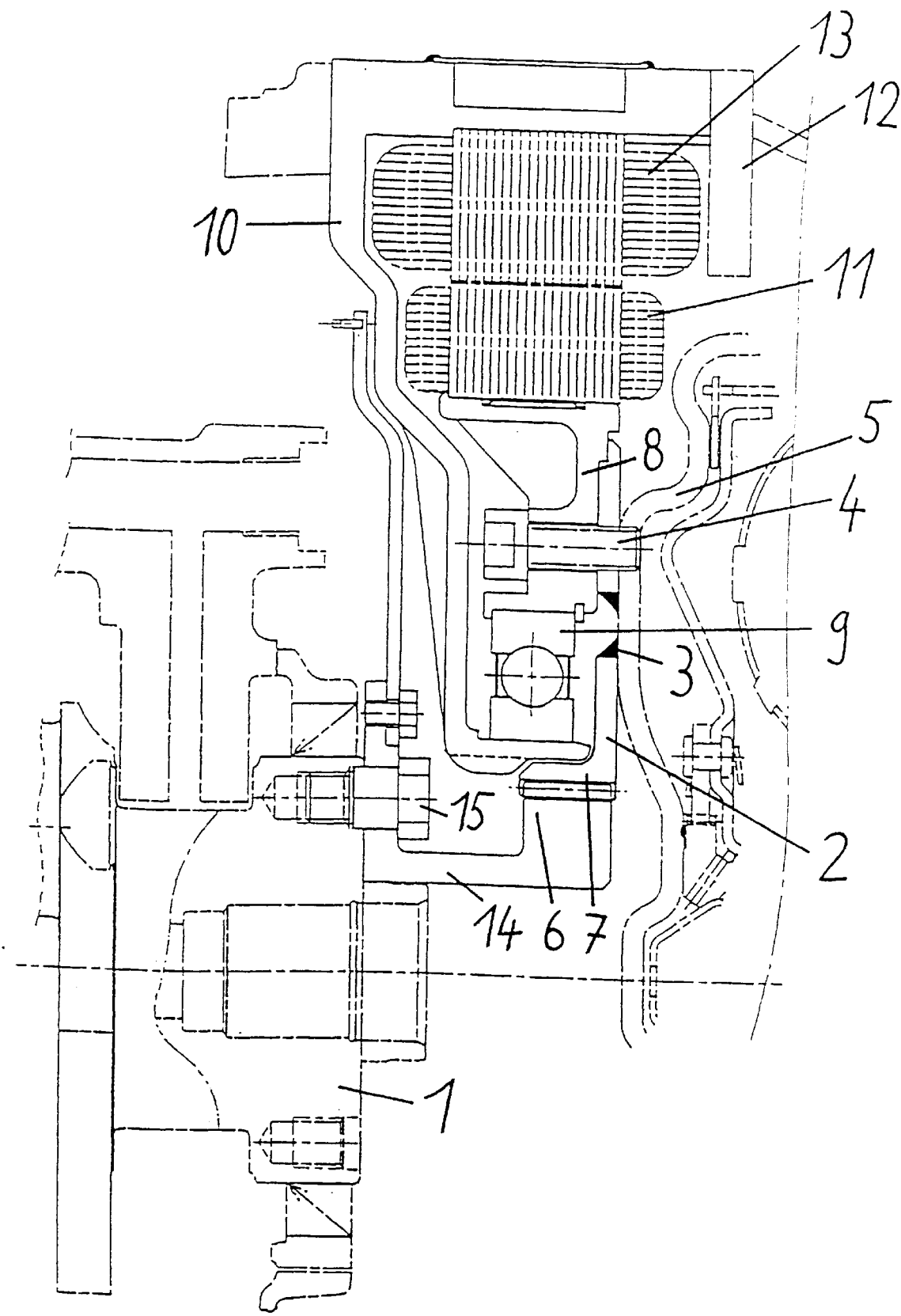

CONNECTION FOR A TORQUE CONVERTER

BACKGROUND AND SUMMARY OF THE INVENTION

This application claims the priority of German Application No. 197 47 964.2, filed Oct. 30, 1997, the disclosure of which is expressly incorporated by reference herein.

The invention relates to a torque converter connection to a crankshaft in the drive line of a motor vehicle, for releasable connection of the crankshaft with a pump wheel.

It is already known to connect a torque converter with a crankshaft by a driver disk. German Patent document DE 195 22 869 A1 describes such an arrangement in which the pump wheel of the torque converter is centered in the radial direction in the crankshaft. With this type of centering of the torque converter, assembly is possible only in a difficult and expensive manner since the connection by the driver disk is produced after the crankshaft and torque converter are slid into one another.

Hence, the goal of the invention is to provide a releasable connection between a torque converter and a crankshaft in which the torque converter is fixed in the radial direction independently of the crankshaft.

This goal is achieved according to the invention by a driving connection for torque transfer in the drive line of a motor vehicle for releasable connection of a crankshaft with a pump wheel of a hydrodynamic torque converter located coaxially. The pump wheel is supported integrally with the drive housing by a radial bearing and is mounted rotatably. Additional embodiments of the invention are described herein.

According to the invention, a driving connection is provided for transferring torque in the drive line of the motor vehicle for releasable connection of a crankshaft with a pump wheel of a coaxially mounted hydrodynamic torque converter, in which the pump wheel is rotatably mounted integrally with the drive housing by a radial bearing.

This has the advantage that the pump wheel is centered by virtue of its support by means of the radial bearing and, therefore, no centering connection for the crankshaft is required, which simplifies assembly.

In a preferred embodiment of the invention, the connection of the pump wheel and the crankshaft by a shaft-hub connection provided with lengthwise teeth has the advantage that the torque converter connection can be mounted even more simply. For this purpose, the crankshaft and the torque converter need only be pushed together in the axial direction until the lengthwise teeth of the shaft and hub mesh with one another.

In addition, axial and radial tolerances are compensated by the lengthwise teeth.

In one advantageous embodiment of the invention, a rotor of an electrical machine is formed on the pump wheel. Thus, this rotor as it turns can work as an electrical machine together with a stator mounted on the drive housing. Operation of the electrical machine as both a motor and a generator can be provided. With motor operation in particular, it is also possible to have an operating mode as the stator motor for the internal combustion engine.

In another advantageous embodiment of the invention, provision is made such that the rotor is connected shapewise with the pump wheel or is designed integrally therewith and such that the rotor is rotatably mounted integrally with the drive housing by the radial bearing and supports the pump wheel.

This has the advantage that the air gap between the rotor and the stator can be made very small regardless of the tolerances of the alignment of the crankshaft and pump wheel, thus improving the efficiency of the electrical machine.

Another advantageous embodiment of the invention provides that the radial bearing is accommodated in a housing of the electrical machine that is fastened to the drive housing.

This has the advantage that the electrical machine becomes a sealed unit which can be mounted easily and independently of the torque converter.

Other objects, advantages and novel features of the present invention will become apparent from the following detailed description of the invention when considered in conjunction with the accompanying drawings.

BRIEF DESCRIPTION OF THE DRAWINGS

The single FIGURE is a partial sectional view showing the connection of a pump wheel of a hydrodynamic torque converter with a starter/generator unit to a crankshaft via lengthwise teeth according to the present invention.

DETAILED DESCRIPTION OF THE DRAWINGS

Referring to the FIGURE, at one end section of a crankshaft 1, a drive flange 14 is mounted by bolts 15. The drive flange 14 is designed at the connecting point as a shaft 6 with lengthwise teeth for its connection with a pump wheel 5 of a partially shown hydrodynamic torque converter. This shaft 6 is pushed into a drive flange 2 of the hydrodynamic torque converter that is designed as a hub 7 with lengthwise teeth. Drive flange 2 is connected permanently by a welded seam 3 with pump wheel 5 of the torque converter.

The lengthwise teeth of the shaft-hub connection 6, 7 transmit the torque from crankshaft 1 to the torque converter.

In addition, rotor windings 11 are mounted on pump wheel 5, so that it operates as an electrical machine as it turns, together with stator windings 13 mounted on a drive housing 12. It is then possible to operate the electrical machine as both a motor and as a generator. During motor operation in particular, an operating mode functioning as the starter motor for the internal combustion engine is also provided. Rotor windings 11 are connected with pump wheel 5 by a rotor 8 fastened to the wheel by bolts 4.

To secure the hydrodynamic torque converter in the radial direction, rotor 8 is supported by a radial bearing 9 in a housing 10 of the electrical machine that is connected with drive housing 12.

To mount the torque converter connection on crankshaft 1, rotor 8 of the electrical machine is fastened to pump wheel 5 by bolts 4 while housing 10 of the electrical machine is mounted on drive housing 12. Then crankshaft 1 and the torque converter are pushed together in the axial direction so that the lengthwise teeth of shaft 6 and hub 7 mesh with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving connection for a torque transfer in a drive line of a motor vehicle which releasably connects a crankshaft with a pump wheel of a hydrodynamic torque converter coaxially arranged, wherein the pump wheel is rotatably mounted and supported integrally with a drive housing via a radial bearing, and wherein a rotor of an electrical machine is formed on the pump wheel.

2. The driving connection according to claim 1, wherein the connection between the pump wheel and the crankshaft is a shaft-hub connection provided with lengthwise teeth.

3. The driving connection according to claim 1, wherein the electrical machine is operable as both a motor and a generator.

4. The driving connection according to claim 1, wherein the rotor is coupled shapewise with the pump wheel, and further wherein the rotor is supported integrally with the drive housing via the radial bearing and is rotatably mounted.

5. The driving connection according to claim 4, wherein the radial bearing is accommodated in a housing of the electrical machine that is mounted on the drive housing.

6. The driving connection according to claim 1, wherein the radial bearing is accommodated in a housing of the electrical machine that is mounted on the drive housing.

7. The driving connection according to claim 1, wherein the rotor is designed integrally with the pump wheel, and further wherein the rotor is supported integrally with the drive housing via the radial bearing and is rotatably mounted.

8. The driving connection according to claim 1, wherein the electrical machine is operable as both a motor and a generator.

9. The driving connection according to claim 8, wherein the rotor is coupled shapewise with the pump wheel, and further wherein the rotor is supported integrally with the drive housing via the radial bearing and is rotatably mounted.

10. The driving connection according to claim 8, wherein the radial bearing is accommodated in a housing of the electrical machine that is mounted on the drive housing.

11. The driving connection according to claim 8, wherein the rotor is designed integrally with the pump wheel, and further wherein the rotor is supported integrally with the drive housing via the radial bearing and is rotatably mounted.

* * * * *